US012810435B2

(12) United States Patent
Amram et al.

(10) Patent No.: US 12,810,435 B2
(45) Date of Patent: Nov. 24, 2026

(54) TRACK AWARE DETECTION FOR OBJECT TRACKING SYSTEMS

(71) Applicant: MICROSOFT TECHNOLOGY LICENSING, LLC, Redmond, WA (US)

(72) Inventors: Shay Amram, Raanana (IL); Zvi Figov, Modiin (IL); Mordechai Kadosh, Raanana (IL); Yonit Hoffman, Herzeliya (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 210 days.

(21) Appl. No.: 18/400,323

(22) Filed: Dec. 29, 2023

(65) Prior Publication Data

US 2025/0095161 A1 Mar. 20, 2025

Related U.S. Application Data

(60) Provisional application No. 63/583,038, filed on Sep. 15, 2023.

(51) Int. Cl.
*G06V 10/00* (2022.01)
*G06T 7/20* (2017.01)
(Continued)

(52) U.S. Cl.
CPC .................. *G06T 7/20* (2013.01); *G06T 7/70* (2017.01); *G06V 10/25* (2022.01); *G06V 10/56* (2022.01);
(Continued)

(58) Field of Classification Search
CPC ...... G06V 10/82; G06V 10/85; G06V 10/761; G06V 10/762; G06V 10/764;
(Continued)

(56) References Cited

U.S. PATENT DOCUMENTS 9,141,196 B2 * 9/2015 Sheng ..................... G06F 3/005
10,061,999 B1 * 8/2018 Kwatra .................. G06V 20/52
(Continued)

OTHER PUBLICATIONS

Park Yong Suk, "KR 20220070624 A Real user detection method and system in the obsevation scene"; date published May 31, 2022.*
(Continued)

*Primary Examiner* — Amir Alavi

(57) ABSTRACT

Examples of the present disclosure describe systems and methods for track aware object detection. In examples, image content comprising one or more objects is received. Frames in the image content are identified. Candidate bounding boxes are created around objects to be tracked in the frames and a confidence score is assigned to each candidate bounding box. The candidate bounding boxes for each object are compared to a predicted bounding box that is generated based on a current track for the object. Candidate bounding boxes that are determined to be similar to the predicted bounding box and/or that exceed a confidence score threshold are selected. The selected candidate bounding boxes are filtered until a single candidate bounding box that is most representative of each object to be tracked remains. The frame comprising the representative bounding box for each object is then added to a current track for the object.

13 Claims, 7 Drawing Sheets

(51) Int. Cl.
*G06T 7/70* (2017.01)
*G06V 10/25* (2022.01)
*G06V 10/56* (2022.01)
*G06V 10/764* (2022.01)

(52) U.S. Cl.
CPC .. *G06V 10/764* (2022.01); *G06T 2207/30241* (2013.01); *G06V 2201/07* (2022.01)

(58) Field of Classification Search
CPC .. G06V 10/765; G06V 10/7715; G06V 10/25; G06V 10/56; G06V 2201/07; G06T 7/20; G06T 7/246; G06T 7/70; G06T 7/44; G06T 2207/20081; G06T 2207/20084; G06T 2207/30241
See application file for complete search history.

(56) References Cited

U.S. PATENT DOCUMENTS 10,755,142 B2 * 8/2020 Saliou .................... G06N 3/048
10,755,144 B2 * 8/2020 Saliou .................. G06N 3/0464
10,922,574 B1 * 2/2021 Tariq .................... G06N 3/0464
11,798,288 B2 * 10/2023 Park ......................... G06N 3/04
12,106,537 B1 * 10/2024 Gordon .................. G06V 10/25
12,277,717 B2 * 4/2025 Zhou .................. G06V 10/7715
12,437,552 B2 * 10/2025 Lee ........................ G06V 10/62
12,462,573 B1 * 11/2025 Joshi ...................... G06V 10/25
2021/0192182 A1 * 6/2021 Huang ................ G06F 18/2413
2025/0095161 A1 * 3/2025 Amram .................. G06V 10/56

OTHER PUBLICATIONS

Lin et al., "TW 202223737 A, Object matching and identification method and system thereof"; sate published Jun. 16, 2022.*
International Search Report and Written Opinion Received in PCT Application No. PCT/US2024/042592, mailed on Jan. 23, 2025, 17 pages.
Invitation to Pay Additional Fees Received in PCT Application No. PCT/US2024/042592, mailed on Nov. 28, 2024, 9 pages.
Liang, et al., "Non-Maximum Suppression Performs Later in Multi-Object Tracking", Applied Sciences, vol. 12, Issue No. 3334, Mar. 25, 2022, 11 Pages.
International Preliminary Report on Patentability (Chapter I) received for PCT Application No. PCT/US2024/042592 mailed on Mar. 26, 2026, 11 Pages.

* cited by examiner

TRACK AWARE DETECTION FOR OBJECT TRACKING SYSTEMS

CROSS-REFERENCE TO RELATED APPLICATIONS

This application claims the benefit of U.S. Provisional Application No. 63/583,038 filed Sep. 15, 2023, entitled "Track Aware Detection for Object Tracking Systems," which is incorporated herein by reference in its entirety.

BACKGROUND

Object tracking is a process of detecting objects of one or more classes in digital images and videos and tracking the movement of the objects over time. In many cases, object tracking techniques rely on generating one or more bounding boxes for an object in a frame of a digital image or video. A bounding box that is most representative of the object is then selected and the frame comprising the bounding box is then added to a track of the object (e.g., collection of previously collected frames comprising bounding boxes) without consideration of the insights provided by the track.

It is with respect to these and other general considerations that the aspects disclosed herein have been made. Also, although relatively specific problems may be described, it should be understood that the examples should not be limited to solving the specific problems identified in the background or elsewhere in this disclosure.

SUMMARY

Examples of the present disclosure describe systems and methods for track aware object detection. In examples, image content comprising one or more objects is received by an image processing system. An image processor of the system identifies one or more frames in the image content. An object detector creates one or more candidate bounding boxes around objects to be tracked in the frames and assigns a confidence score to each candidate bounding box. An object tracker compares the candidate bounding boxes for each object to a predicted bounding box that is generated based on a current track for the object. Candidate bounding boxes that are determined to be similar to the predicted bounding box and/or that exceed a confidence score threshold are selected. A rescoring engine may adjust the confidence scores of the selected candidate bounding boxes and/or may reprioritize the selected candidate bounding boxes to ensure that the selected candidate bounding boxes are not eliminated and are considered by the object tracker. A filtering algorithm filters the selected candidate bounding boxes until a single candidate bounding box that is most representative of each object to be tracked remains. An update mechanism may then add the frame comprising the representative bounding box for each object to a current track for the object.

In some examples, a universal embedding model creates a vector embedding of one or more objects in the representative bounding box. To create the vector embedding, the aspect ratio of the object in the representative bounding box is inspected, then the representative bounding box is rotated and resized, if necessary, such that the aspect ratio, the orientation, and/or the size of the object matches or is approximately similar to an expected aspect ratio, orientation, and/or size of the object. The representative bounding box as adjusted is provided to the universal embedding model, which creates the vector embedding for an object in the representative bounding box as adjusted.

In some examples, each object to be tracked is associated with one or more clusters of vector embeddings ("clusters") for the object. The vector embeddings in each cluster are derived from previous bounding boxes in the track for the object. Each cluster may represent a different perspective of the object (e.g., a front perspective, a top perspective, a side perspective). Upon creation of the vector embedding for an object in the representative bounding box, the vector embedding is compared to the average vector embedding for each cluster associated with the object. The vector embedding is then added to the cluster of the average vector embedding that is most similar to the vector embedding.

In some examples, after a current track for an object is completed, a determination is made regarding whether the completed track meets a minimum confidence threshold value for persisting the track. To make the determination, multiple sliding windows of frames in the track are evaluated, where the median confidence calculation for each sliding window is used to determine whether that sliding window is above the minimum confidence threshold value. If a specified number of sliding windows (or a specified number of contiguous sliding windows) are determined to be above the minimum confidence threshold value, the completed track is persisted (e.g., stored for some time period).

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Examples are described with reference to the following figures.

DETAILED DESCRIPTION

Figure 1:
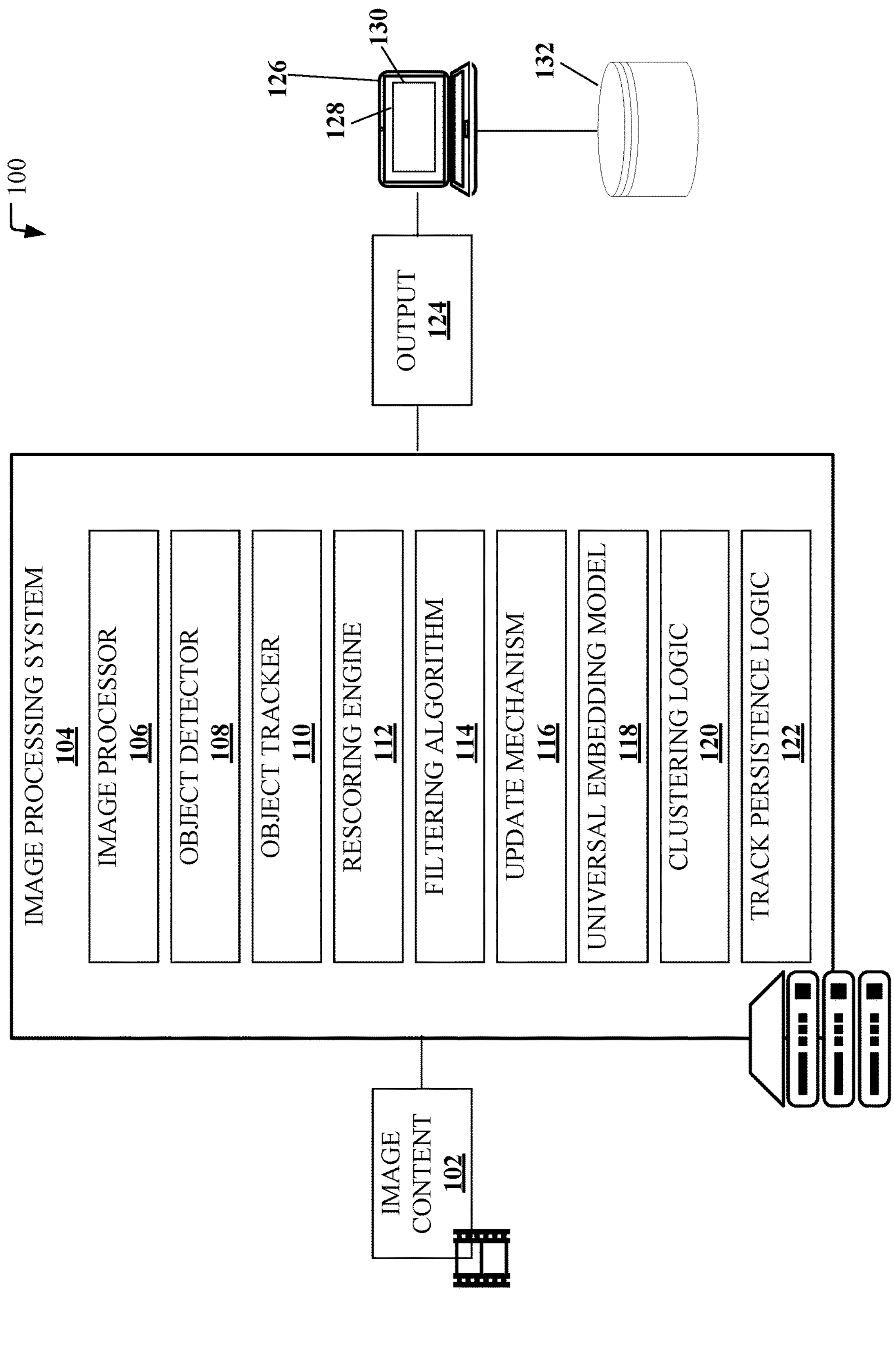
FIG. 1 illustrates an example system for implementing track aware object detection.

In many previous object tracking systems, for a single frame of image content (e.g., a digital image or a video), an object detector produces a multitude of bounding boxes for a detected object in the frame. A bounding box, as used herein, refers to geometric shape or set of coordinates defining a geometric shape that may enclose at least a portion of one or more objects in image content. The object detector then uses a filtering technique, such as Non-Maximum Suppression (NMS), to eliminate duplicate bounding boxes for the same detected object and to select the bounding box that is most representative of the detected object. If the selected bounding box is determined to meet a threshold confidence level for the detected object, the frame comprising the selected bounding box is then added to a track for the detected object. A track refers to a set of one or more bounding boxes collected for a detected object over frames of image content. Although a current track for the detected object may already exist, the object detector selects the bounding box without considering the bounding boxes selected for the detected object in previous frames (e.g., each frame is considered independently of all other frames). A current track refers to a track in which the detected object is detected in current frames of image content. As a result of selecting a bounding box without considering the previous frames (e.g., the current track for an object), the object detector eliminates some bounding boxes that should be selected and selects some bounding boxes that should be eliminated, which results in the reduced accuracy of previous object tracking systems.

The present disclosure provides a solution to the above-described deficiencies of previous object tracking systems. Embodiments of the present disclosure describe systems and methods for track aware object detection. In examples, image content comprising one or more frames is received by an image processing system. The frames respectively comprise a still image of one or more objects and are arranged in a sequence such that playback of the sequence illustrates a motion of the objects (e.g., in a scene) over a time period. An image processor of the image processing system identifies frames in the image content and may perform one or more preprocessing operations for the frames. An object detector of the image processing system detects one or more objects in the frames and creates one or more candidate bounding boxes around at least a portion of the detected objects. In examples, the objects detected by the object detector are predetermined to be objects of interest. For instance, the object detector may be trained to detect certain classes of objects (e.g., cars, people, furniture). The object detector may also assign one or more confidence scores to each candidate bounding box. A confidence score indicates the probability that an object in a candidate bounding box belongs to a particular class of objects.

An object tracker of the image processing system compares the candidate bounding boxes for each object to a predicted bounding box for the object. A predicted bounding box for an object is generated based on a current track for the object, if one exists. For instance, if the object detector has detected an object in previous frames of image content, the object tracker determines where the object is likely to appear in a current frame based an apparent motion path of the object through the previous frames (if the object is in motion) or the position of the object in the previous frames (if the object is not in motion). The candidate bounding boxes are compared to the predicted bounding box using one or more techniques for evaluating object detection accuracy. Candidate bounding boxes that are determined to match or be similar to the predicted bounding box and that have confidence scores exceeding a threshold confidence value are selected.

In some examples, a rescoring engine of the image processing system adjusts the confidence scores of the selected candidate bounding boxes to ensure that the selected candidate bounding boxes exceed the threshold confidence value. The rescoring engine may also reprioritize the selected candidate bounding boxes to compensate for ordering bias that may be inherent to the candidate bounding box filtering process.

A filtering algorithm of the image processing system, such as NMS, filters the selected candidate bounding boxes for each object using techniques for evaluating object detection accuracy. When a single selected candidate bounding box for each object remains, each bounding box is selected as the representative bounding box for the object in the current frame. An update mechanism of the image processing system may then add the frame comprising the representative bounding box for each object to the current track for the object. For instance, the representative bounding box may represent a most recent location of the object within a current track for the object. In examples, the frame comprising the representative bounding box is stored in the current track along with any confidence scores for the representative bounding box and metadata for the representative bounding box, such as a timestamp, location information, author or owner information, and other properties of the image content.

In some embodiments of the present disclosure, a universal embedding model of the image processing system creates one or more vector embeddings of an object in a representative bounding box. The universal embedding model differs from previous embedding models in that previous embedding models are trained for one object class and require a specific spatial dimension for objects in the object class. If a previous embedding model receives an object having different spatial dimensions than those required, the subsequent embedding by the previous embedding model will result in a substantial loss of information for the object. To avoid this substantial loss of information, the previous embedding model must be retrained or a new embedding model must be trained, both of which are costly and time consuming scenarios.

In contrast to previous embedding models, the universal embedding model is an embedding model that is trained for use with multiple object classes and/or multiple spatial dimensions. In examples, the universal embedding model is trained based on supervised or unsupervised learning techniques using training data that include a corpus of annotated and/or unannotated media. The corpus of annotated and/or unannotated media includes images in one or more aspect ratios, where a preferred or expected aspect ratio may be identified (e.g., via annotations or other user input) for each object or object class. The corpus of annotated and/or unannotated media also includes object and object class classifications, features of various objects in various object classes, example vector embeddings comprising object features, and/or instructions or algorithms for performing vector embedding.

The universal embedding model is then used in a manner that is less specific to the object classes and/or multiple spatial dimensions used to train the universal embedding model. As one example, the universal embedding model is trained to identify an object (and features of the object) in a bounding box based on the training data used to train the universal embedding model. Further based on the training data, the universal embedding model is trained to expect the primary features of the object (e.g., person) to be located in a particular section (e.g., the middle section) of the bounding box when a particular aspect ratio is being used and to expect the remainder of the bounding box to be background or non-primary features of the object. Accordingly, as part of creating the vector embedding, the update mechanism (or the universal embedding model as a preprocessing operation) inspects the aspect ratio of the object in the representative bounding box. The representative bounding box is rotated and resized, if necessary, such that the aspect ratio, the orientation, and/or the size of the object matches or is approximately similar to an expected aspect ratio, orientation, and/or size for the object. That is, the representative bounding box may be rotated and resized to arrange the primary features of the object into the particular section of the representative bounding box, as expected by the universal embedding model. The representative bounding box as adjusted is then provided to the universal embedding model, which creates the vector embedding for the object in the selected bounding box as adjusted.

In some embodiments of the present disclosure, a smart clustering technique is used to maintain clusters of vector embeddings for a detected object. For example, the representative bounding boxes for an object may collectively comprise multiple perspectives of the object due to the movement of the object and/or the movement of an image capture device that recorded the object (e.g., a camera or another image recording device). The vector embeddings for the representative bounding boxes are clustered based on the perspective represented by the bounding box. For instance, the image processing system may maintain a first cluster comprising vector embeddings representing a front perspective of an object, a second cluster comprising vector embeddings representing a side perspective of an object, and so on. Each cluster may include an identifier used to correlate the various perspectives to the same object. For instance, each vector embedding may include an object identifier (e.g., a hash value, an object name, an object description) and/or additional object information for an object (e.g., a detection time, a frame in which the object occurred, a scene or background in which the object occurred). The object identifier and/or additional object information is propagated to and stored by each cluster for the object. Each vector embedding may also include a specified perspective of the object (e.g., as a feature of the vector embedding or as metadata of the vector embedding). The specified perspective is used to provide the vector embedding to a corresponding cluster. For instance, a vector embedding indicating that feature data corresponding to the front perspective of an object is stored by the vector embedding (e.g., the specified perspective is "Front") is provided to a cluster comprising vector embeddings representing a front perspective of an object.

Upon creation, by the universal embedding model, of a vector embedding for an object, the created vector embedding is compared to the average vector embedding for each cluster associated with the object. The comparison includes verifying that the object identifier and/or additional object information stored by each cluster matches or represents a particular range of time or frames. For instance, for an object that is detected in frames 25-50 of image content, only the clusters comprising the object identifier for the object and feature data detected in frames 25-50 will be included in the comparison. In examples, the comparison is based on techniques such as Euclidean distance or Cosine similarity. The created vector embedding is then added to the cluster of the average vector embedding that is most similar to the created vector embedding.

In some examples, in accordance with the smart clustering technique, the vector embedding for one or more representative bounding boxes are not added to a cluster. For instance, as clustering is a computationally expensive operation, vector embeddings may not be created or clustered for each representative bounding box. Instead, representative bounding boxes are clustered based on a specified interval or based on the number of representative bounding boxes that have already been clustered for the object. For instance, a first representative bounding box may be clustered after two representative bounding boxes have been created, a second representative bounding box may be clustered after four additional representative bounding boxes have been created, a third representative bounding box may be clustered after eight additional representative bounding boxes have been created, and so on. Accordingly, the smart clustering technique applies frequent clustering at the beginning of a track (when fewer vector embeddings are available) and applies progressively less frequent clustering as the track expands, thus maintaining significant vector embeddings while mitigating the increasingly diminishing returns associated with continuing to add vector embeddings to a well-populated set of vector embeddings.

In some embodiments of the present disclosure, a determination is made regarding whether to persist a completed track. A track is completed when the object in the track is no longer detected in current or subsequent frames of the image content, or is not detected in current or subsequent frames of the image content for a particular number of frames or an amount of or frames. For example, a track for an object is based on the object being detected in frames 5-50 of image content. However, the object does not appear in the image content after frame 50. As such, the track for the object is considered completed at frame 50. In another example, an object is detected in frames 5-50 and frames 100-145 of image content and does not appear in the image content after frame 145. In some instances, a single track for the object is based on the object being detected in frames 5-50 and frames 100-145 of image content. In other instances, a first track for the object is considered completed at frame 50 and a second track is created for frames 100-145. For example, in such instances, a ruleset may dictate that a track for an object is closed if the object is not detected for 25 consecutive frames.

To determine whether to persist a completed track, multiple sliding windows of frames in the completed track are evaluated. A sliding window refers to an interval defining a set amount of time or number of occurrences. For instance, a sliding window may measure a specific number of frames in a track. Evaluating the sliding windows comprises assigning a sliding window to one or more portions of a completed track such that a contiguous portion of the completed track is represented by one or more sliding windows. For instance, for a completed track having 100 frames, a sliding window may be assigned to cover 25 frame increments (e.g., a first sliding window comprises frames 1-25, a second sliding window comprises frames 26-50, and so on). In some examples, the sliding windows overlap.

A median confidence calculation is determined for each sliding window. The median confidence calculation is determined based on the median value of confidence scores for the object in the representative bounding boxes for the frames. If the median confidence calculation for all or a specific number or percentage of the sliding windows is above a minimum confidence threshold value, the completed track is considered to be exhibiting expected or desired behavior. If a completed track is determined to be exhibiting expected or desired behavior, the completed track is persisted for a specified period of time. If a completed track is determined to not be exhibiting expected or desired behavior, the completed track is not persisted. In examples, a completed track that does not exhibit expected or desired behavior may represent a track in which a detected object is partially obstructed during a portion of the frames, at least a portion of the frames are of poor image quality, or attributes of an object appear to vary significant between one or more frames of image content.

Accordingly, embodiments of the present disclosure provide for a plurality of technical benefits and improvements over previous object tracking systems, such as object detection techniques that consider detections of an object in previous frames of image content to determine detections for the object in a current frame; a universal embedding model that supports multiple object classes and preprocesses imagery into (or receives processed imagery in) a specified format; a smart clustering technique for three dimensional (3D) objects being tracked; and a track persistence strategy for determining whether to persist a completed track based on median confidence calculations for the completed track.

FIG. 1 illustrates an example system for implementing track aware object detection. System 100, as presented, is a combination of interdependent components that interact to form an integrated whole. Components of system 100 may be hardware components or software components (e.g., APIs, modules, runtime libraries) implemented on and/or executed by hardware components of system 100. In one example, components of system 100 are implemented on a single computing device. In another example, components of system 100 are distributed across multiple computing devices and/or computing systems.

In FIG. 1, system 100 comprises image content 102, image processing system 104, image processor 106, object detector 108, object tracker 110, rescoring engine 112, filtering algorithm 114, update mechanism 116, universal embedding model 118, clustering logic 120, track persistence logic 122, output 124, client device 126, display 128, user interface 130, and storage 132. Although system 100 is depicted as comprising a particular combination of computing devices and components, the scale and structure of devices and components described herein may vary and may include additional or fewer components than those described in FIG. 1. Further, although examples in FIG. 1 and subsequent figures will be described in the context of multi-object, multi-class detection and tracking systems, the examples are equally applicable to single-object and single-class detection and tracking systems.

Image content 102 is provided to image processing system 104. Image content 102 comprises one or more frames, which may comprise one or more objects. Image content 102 may be provided by a computing device or service external to image processing system 104 or image content may be provided by a user directly interfacing with image processing system 104 (e.g., via a user interface).

Image processing system 104 represents or incorporates an object tracking system for detecting and tracking the movement of objects of interest over a time period. In some examples, image processing system 104 is in the form a cloud-based server or other device that processes image-processing operations, such as object detection processes. In other examples, image processing system 104 is implemented in a local or a client device.

When image processing system 104 receives image content 102, image processor 106 identifies frames in image content 102 and may preprocess image content 102, for example, to convert image content 102 into a format that is suitable for object detector 108 to detect objects present in image content 102. For example, image content 102 may be preprocessed to change the color formatting of image content 102 (e.g., changing to a red-green-blue (RGB) or a blue-green-red (BGR) color scheme), perform brightness transformations or corrections for image content 102 (e.g., via gamma correction, histogram equalization, or sigmoid stretching), change the aspect ratio of image content 102, filter or segment image content 102 (e.g., via low pass filtering, high pass filtering, or Laplacian filtering), or perform other changes to image content 102.

Object detector 108 detects objects within image content 102. Object detector 108 detects objects within image content 102, in part, by creating candidate bounding boxes for the objects that are detected in the frames of image content 102. For example, object detector 108 may implement an object detection technique such as Region-Based Convolutional Neural Networks (R-CNNs), You Only Look Once (YOLO), Scale-Invariant Feature Transform (SIFT), or Histogram of Oriented Gradients (HOG). Object detector 108 may also assign one or more confidence scores to each candidate bounding box. For instance, in a single-class object tracking system, object detector 108 assigns a confidence score for a single object class for the object (e.g., object class 'cat' is assigned a confidence score of 90%). Whereas, in a multi-class object tracking system, object detector 108 assigns a confidence score for multiple object classes for the object (e.g., object class 'cat' is assigned a confidence score of 90%, object class 'dog' is assigned a confidence score of 30%, and object class 'goat' is assigned a confidence scorer of 5%).

Object tracker 110 compares the candidate bounding boxes for each object to a predicted bounding box for the object. The predicted bounding box for an object is generated based on a current track for the object, if one exists. For instance, object tracker 110 may maintain tracks (e.g., current tracks and completed tracks) for objects that have been detected in previous frames of image content 102. Based on an apparent motion path of the object through the previous frames or the position of the object in the previous frames, object tracker 110 determines where the object is likely to appear (e.g., a predicted location of the object) in a current frame of image content 102. The determination may be based on one or more tracking algorithms, such as Deep Simple Online and Realtime Tracking (DeepSORT), Multi Domain Networks (MDNet), and Recurrent YOLO (ROLO). If a current track for the object does not exist, one of the candidate bounding boxes may be randomly selected or a candidate bounding box may be selected based on criteria, such as which bounding box comprises the highest percentage of the object or comprises the highest ratio of foreground imagery (e.g., the object) to background imagery. The selected bounding box is then used to begin a current track for the object.

Object tracker 110 identifies the candidate bounding boxes that are determined to match or be similar to the predicted bounding box using one or more techniques for evaluating object detection accuracy, such as Intersection over Union (IoU), Average Precision (AP), or mean Average Precision (mAP). Object tracker 110 then selects the candidate bounding boxes ("selected candidate bounding boxes") from the union of the group of bounding boxes that match or are similar to the predicted bounding box and the group of bounding boxes that have confidence scores exceeding a threshold confidence value.

Rescoring engine 112 adjusts the confidence scores of the selected candidate bounding boxes to ensure that the selected candidate bounding boxes exceed the threshold confidence value. In some examples, the rescoring comprises assigning the average score of the bounding boxes in the current track for the object to a selected candidate bounding box. For instance, if the current track for an object comprises a first bounding box assigned a confidence score of 90%, a second bounding box assigned a confidence score of 80%, and a third bounding box assigned a confidence score of 40%, a confidence score of 70% (i.e., (90%+80%+40%)/3) is assigned to the selected candidate bounding box. In some examples, the rescoring comprises assigning a selected candidate bounding box a minimum confidence score needed to exceed the threshold confidence value. For instance, if the threshold confidence value is set to 60% (e.g., 60% is the minimum confidence score that will satisfy the threshold confidence value), a confidence score of 60% is assigned to the selected candidate bounding box.

Rescoring engine 112 also or alternatively reprioritizes the selected candidate bounding boxes to compensate for ordering bias that may be inherent to the candidate bounding box filtering process. For instance, in some examples, filtering algorithm 114 is biased towards the order candidate bounding boxes are received such that the first candidate bounding box received by filtering algorithm 114 is more likely to be selected than subsequent candidate bounding boxes received by filtering algorithm 114. The selected candidate bounding boxes may be reprioritized based on techniques for evaluating object detection accuracy. For instance, the selected candidate bounding boxes may be prioritized according to their IoU scores.

Filtering algorithm 114 filters the selected candidate bounding boxes for each object. In examples, the filtering comprises identifying a predicted bounding box or a ground truth bounding box for an object in a frame. A ground truth bounding box refers to a bounding box that most accurately encloses or represents the object. A ground truth bounding box may be manually annotated and may represent the ideal output from object detector 108. The selected candidate bounding boxes are then compared to the predicted bounding box or the ground truth bounding box. The selected candidate bounding boxes that least match the predicted bounding box or the ground truth bounding box are filtered until a single selected candidate bounding box remains. Filtering algorithm 114 then selects the remaining candidate bounding box for each object as the representative bounding box for the object in the frame. Examples of filtering algorithm 114 include NMS and Confluence.

Update mechanism 116 adds the frame comprising the representative bounding box for each object to a current track. In some examples, the frame comprising the representative bounding box for an object is added to a current track that is tracking a single object (e.g., the object in the representative bounding box). For instance, a frame comprising the first representative bounding box is added to a first track for a first object, a frame comprising the second representative bounding box is added to a second track for the second object, and so on. In other examples, the frame comprising the representative bounding box for an object is added to a current track that is tracking multiple objects. For instance, a frame comprising the first representative bounding box for a first object and the frame comprising a second representative bounding box for a second object area added to the same current track. Each frame comprising a representative bounding box may be stored in a track along with any confidence scores and/or metadata for the representative bounding box.

Universal embedding model 118 creates vector embeddings of objects in a representative bounding box. Universal embedding model 118 is trained for use with multiple object classes and/or multiple spatial dimensions for object classes. Examples of universal embedding model 118 include Principal Component Analysis (PCA) models, Singular Value Decomposition (SVD) models, Latent Dirichlet Allocation (LDA) models, and Word2Vec models. In examples, update mechanism 116 or universal embedding model 118 preprocesses representative bounding boxes that are to be provided as input to universal embedding model 118. For instance, the aspect ratio of the object in a representative bounding box is inspected and the representative bounding box is rotated and resized to match expected input parameters (e.g., aspect ratio, orientation, and/or size). The expected input parameters may correspond to predefined requirements of universal embedding model 118 for an object class. Alternatively, the expected input parameters may correspond to the aspect ratio, orientation, and/or size of an object in a previous representative bounding box or to the features of a vector embedding stored in a cluster associated with the object. The representative bounding box as adjusted is then provided as input to universal embedding model 118.

In some examples, update mechanism 116 (or another component of image processing system 104) applies clustering logic 120 to determine whether a vector embedding created by universal embedding model 118 is to be added to a cluster for an object. Clustering logic 120 specifies criteria for performing a clustering operation. Such criteria may include clustering based on a specified interval of selecting representative bounding boxes for an object or based on the number of representative bounding boxes that have already been clustered for the object. In some examples, clustering logic 120 causes frequent clustering of representative bounding boxes at the beginning of a current track and applies progressively less frequent clustering as the current track expands in order to reduce the computational load associated with repeatedly clustering increasing larger sets of vector embeddings.

In some examples, update mechanism 116 (or another component of image processing system 104) applies track persistence logic 122 to determine whether to persist a completed track. Track persistence logic 122 determines whether the completed track meets a minimum confidence threshold value. For instance, track persistence logic 122 causes multiple sliding windows for a completed track (or a portion of the completed track) to be created, where each sliding window represents a different portion of the completed track, and each sliding window comprises the same number of frames of the track. A median confidence calculation is generated for each sliding window, where the median confidence calculation represents the median confidence score for the representative bounding boxes in the frames of the sliding window. If the median confidence calculation for all or a specific number or percentage of the sliding windows is above a minimum confidence threshold value, track persistence logic 122 determines that the completed track is to be persisted (e.g., stored for an indefinite or a specified period of time).

In examples, image processing system 104 provides output 124 to client device 126 and/or storage 132. Output 124 may include a current or a completed track for one or more objects in image content 102, information relating to completed track persistence decisions, information relating to clustering decisions for vector embeddings, or any other information related to the track aware object detection techniques discussed herein. In one example, image processing system 104 generates a video index that is based on the representative bounding boxes. The video index provides a catalog of the objects detected in image content 102. The catalog may include a record of frames that include particular objects belonging to different classes, confidence scores for the objects in the frames, timestamps associated with the frames, and other information associated with image content 102.

Client device 126 stores, processes, and/or displays output 124. In examples, client device 126 includes a display 128 that allows for output 124 to be displayed in user interface 130 of an application executing on display 128. Storage 132 may be a database or other type of storage that is accessible to one or more computing devices. In an example, storage 132 is cloud storage that is part of one or more cloud servers, which may be the same servers that host or form the image processing system 104. In other examples, storage 132 is local storage, such as an on-premises installation or computing system. Client device 126 may be in communication with the storage 132 and have access to the data stored in the storage 132.

Figure 2:
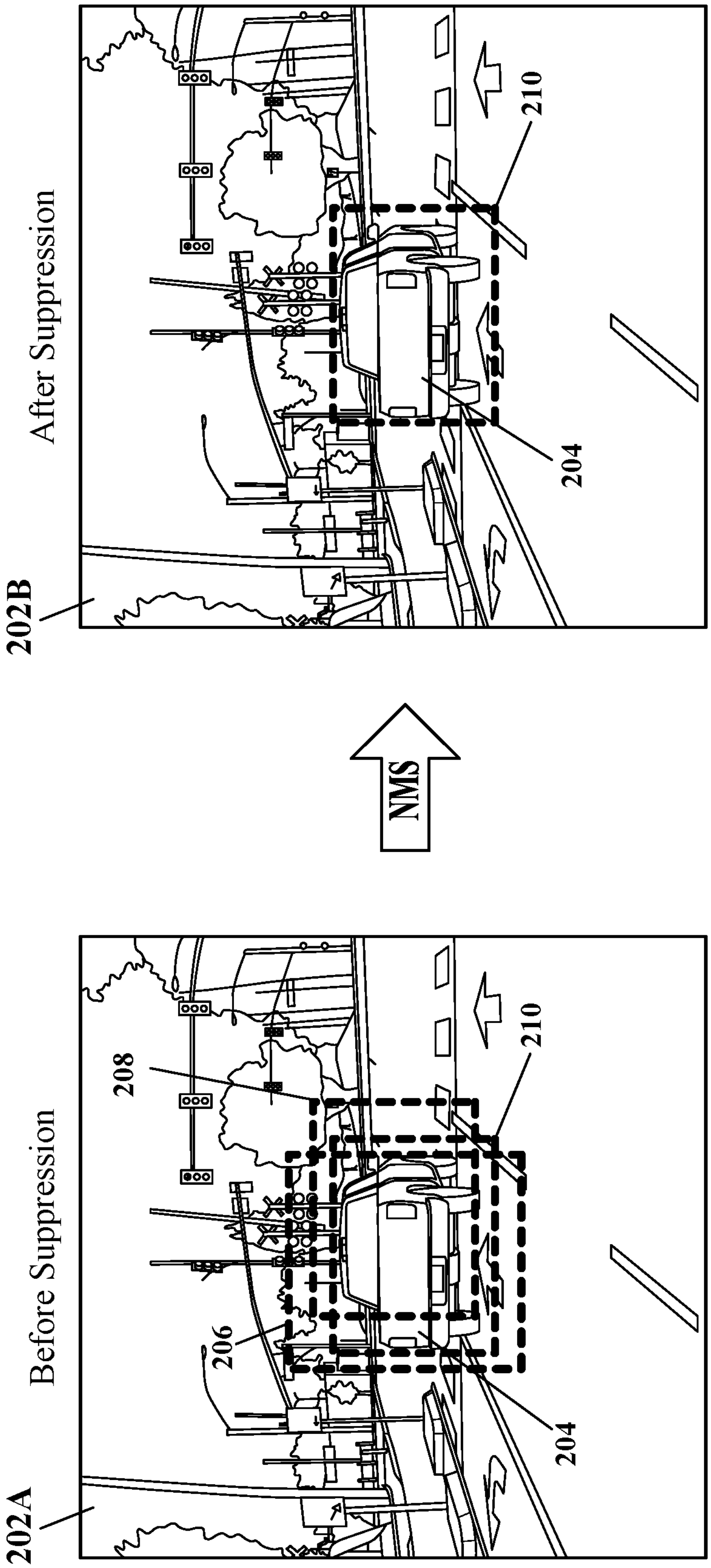
FIG. 2 illustrates example images before and after suppression has been performed.

FIG. 2 depicts example images 202A-B before and after filtering has been performed. The images 202A-B are the same underlying image, with image 202A being shown prior to filtering being performed, and image 202B being shown after filtering has been performed. The images 202A-B include multiple objects, including a truck 204. For simplicity of explanation, only the truck 204 is considered for object detection in this example. However, it should be appreciated that multiple other objects may be detected in other examples and as discussed herein.

The image 202A is shown after the candidate bounding boxes 206, 208, 210 have been generated. More specifically, the image is processed by an object detection algorithm to generate candidate bounding boxes, including a first candidate bounding box 206, a second candidate bounding box 208, and a third candidate bounding box 210. Each of the candidate bounding boxes 206, 208, 210 are generated for the same physical object in the image 202A (e.g., truck 204). However, there is only one truck 204 in the image 202A. As such, the multiple candidate bounding boxes 206, 208, 210 are duplicative, and some of the candidate bounding boxes 206, 208, 210 may be filtered.

Figure 3:
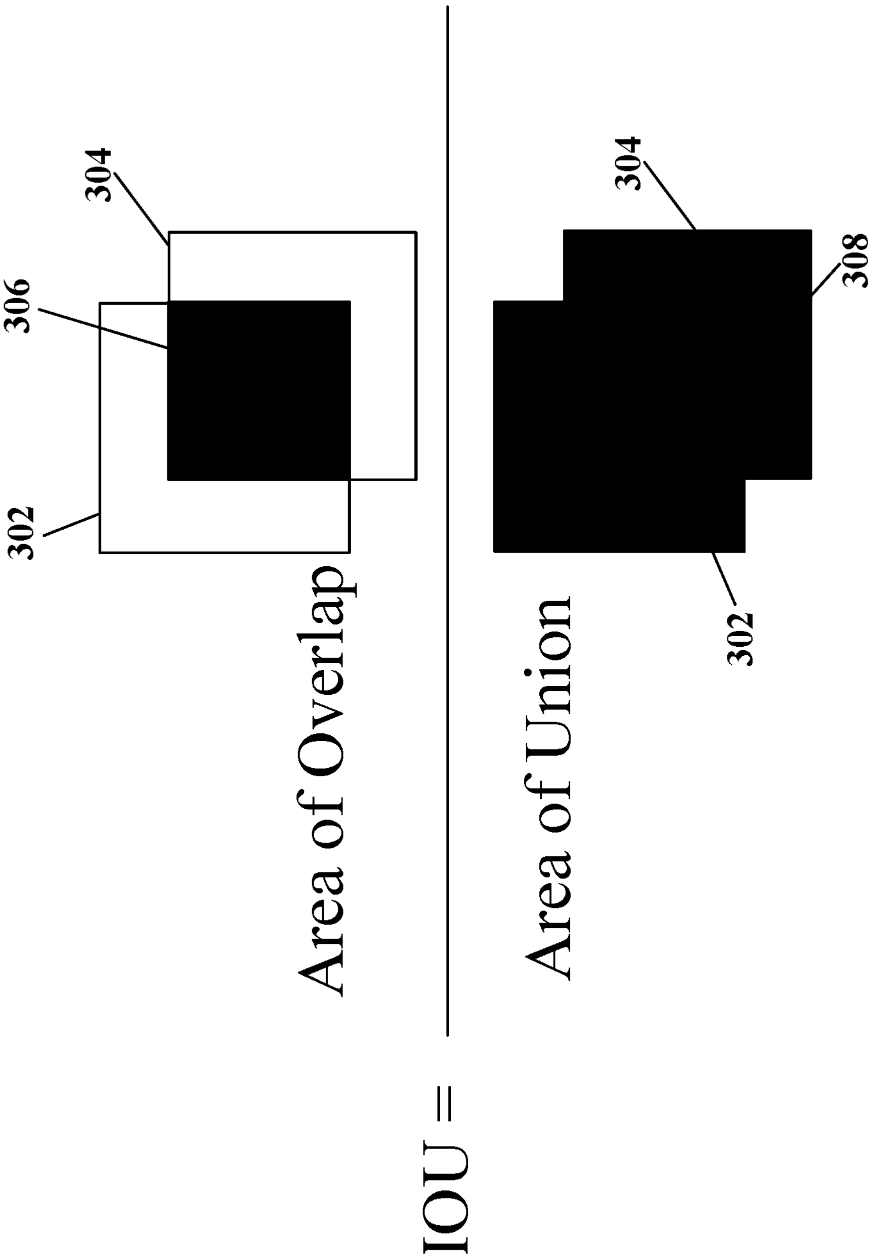
FIG. 3 illustrates an example of performing an intersection-over-union calculation.

As such, a filtering algorithm, such as filtering algorithm 114, is executed to filter one or more of the duplicate candidate bounding boxes 206, 208, 210. One example of a filtering algorithm is NMS. In NMS, an IoU score or metric is generated by comparing the candidate bounding boxes 206, 208, 210 to a predicted bounding box or a ground truth bounding box. FIG. 3 provides an example of calculating an IoU score.

FIG. 3 depicts two bounding boxes (i.e., bounding box 302 and bounding box 304) that are compared to generate an IoU score. In examples, one of the two bounding boxes represents a candidate bounding box and the other of the two bounding boxes represents a predicted bounding box or a ground truth bounding box. To calculate an IoU score, an area of overlap 306 is calculated for bounding box 302 and bounding box 304. The area of union 308 is also calculated for bounding box 302 and bounding box 304. Area of overlap 306 is then divided by area of union 308 to generate the IoU score.

In some examples, the IoU score is compared to a predefined threshold. If the IoU score is below the predefined threshold, the bounding box is filtered. If the IoU score meets or exceeds the predefined threshold, the IoU score is compared to the IoU scores of other bounding boxes (e.g., other duplicate candidate bounding boxes) that meet or exceed the predefined threshold. In examples, each of the duplicate candidate bounding boxes is also compared to the predicted bounding box or ground truth bounding box to generate a respective IoU score. The bounding box having the highest IoU score is then selected, and the other bounding boxes are filtered.

Having described one or more systems that may implement the track aware object detection techniques described herein, methods 400-600 that may be performed by such systems are now provided. Although methods 400-600 are described in the context of system 100 of FIG. 1, the performance of methods 400-600 are not limited to such examples.

Figure 4:
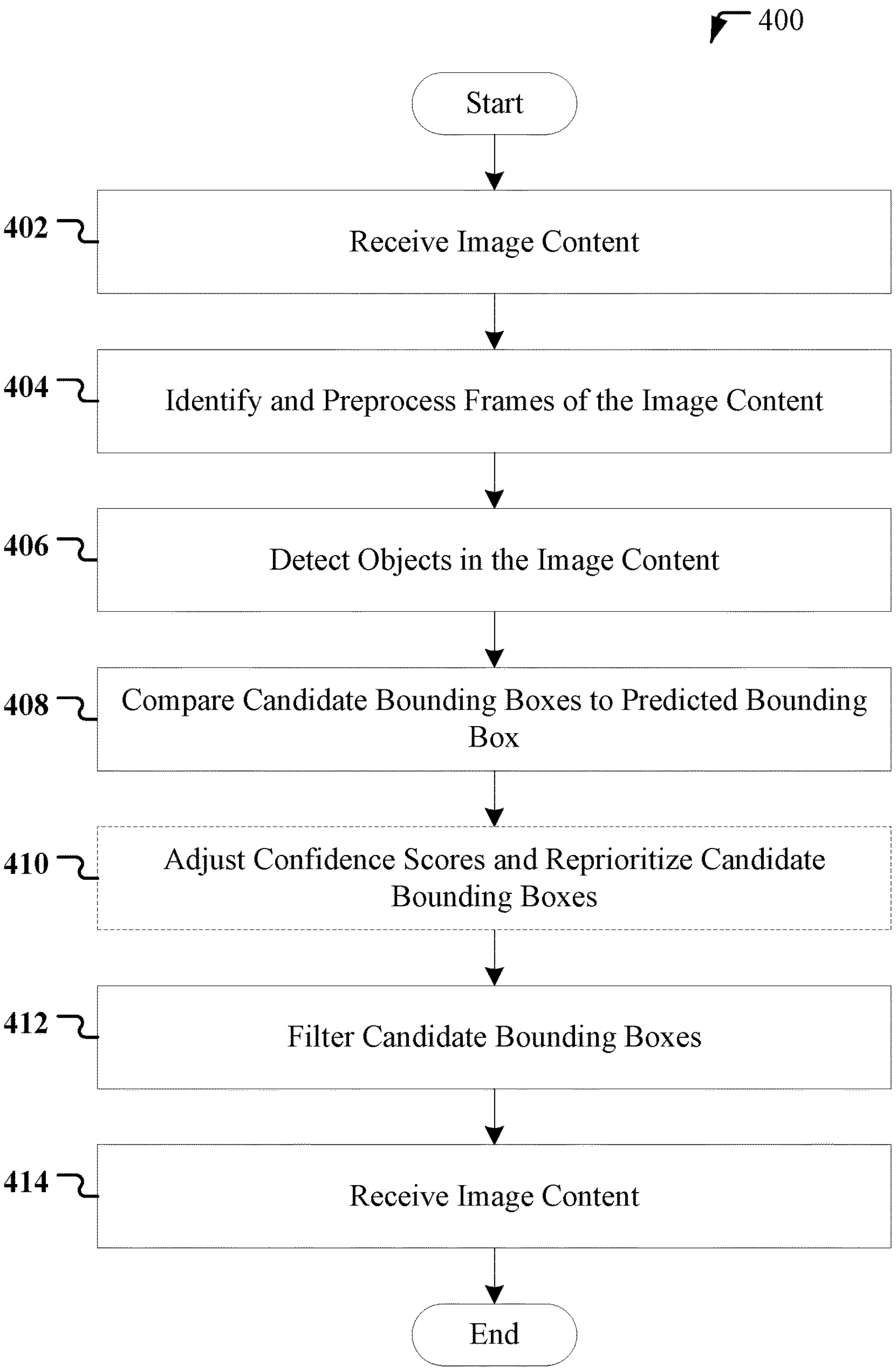
FIG. 4 illustrates an example method for track aware object detection.

FIG. 4 illustrates an example method 400 for track aware object detection. Method 400 begins at operation 402, where image content is received by an image processing system, such as image processing system 104. The image content comprises one or more frames, each of which may include one or more objects to be tracked and one or more objects that are not be tracked. In some examples, at least two of the objects to be tracked may be of different object classes. For instance, a first object may be of a 'Car' object class and a second object to tracked may be of a 'Truck" object class.

At operation 404, frames of the image content are identified and may be preprocessed. For example, one or more frames may be preprocessed to modify the color formatting, aspect ratio, and/or any other attribute of the frame. In some examples, objects are added to or removed from the frames and the sequence order of the frames may be altered.

At operation 406, one or more objects are detected in one or more of the frames. Each of the objects may represent an object of interest (e.g., an object to be tracked). The objects may be detected using object detection techniques, such as R-CNN, YOLO, SIFT, and HOG. As part of the object detection, multiple candidate bounding boxes are created around at least a portion or each detected object. In some examples, at least one confidence score is assigned to each of the candidate bounding boxes.

At operation 408, the candidate bounding boxes for each object is compared to a predicted bounding box for the object. The predicted bounding box is generated from a current track for the object, if one exists. For instance, the predicted bounding box may represent the predicted location of the object in the current frame based on an apparent motion path of the object through the previous frames or the position of the object in the previous frames. The candidate bounding boxes are compared to the predicted bounding box using, for example, IoU. Candidate bounding boxes that are determined to have both an IoU score that exceeds a predefined threshold and a confidence score that exceeds a threshold confidence value are selected.

At optional operation 410, the confidence scores of the selected candidate bounding boxes are adjusted to ensure that the confidence scores exceed the threshold confidence value. For instance, any selected candidate bounding box having a confidence score that is below the threshold confidence value is assigned a new confidence score that meets or exceeds the threshold confidence value. The selected candidate bounding boxes may also be reprioritized. For instance, the selected candidate bounding boxes may be prioritized according to their IoU scores such that the selected candidate bounding boxes having the highest IoU score receives the highest priority, the selected candidate bounding boxes having the second highest IoU score receives the second highest priority, and so on.

At operation 412, the selected candidate bounding boxes for each object are filtered. For example, the selected candidate bounding boxes are provided as input to a filtering algorithm, such as NMS or Confluence. The selected candidate bounding boxes are filtered until a single selected candidate bounding box for each object remains. The remaining selected candidate bounding box for each object is selected as the representative bounding box for that object in the current frame. For instance, a first representative bounding box is selected for a first object in the frame and a second representative bounding box is selected for a second object in the frame.

At operation 414, the frame comprising the representative bounding boxes for each object are added to a respective current track for the object. In examples, the current track for an object includes previous frames that include the previously selected representative bounding boxes for the object. For instance, the current track for an object may comprise a first frame comprising a first representative bounding box for the object (e.g., the first chronological occurrence of the object within the image content) and a second frame comprising a second representative bounding box for the object (e.g., the second chronological occurrence of the object within the image content). The current frame comprising the representative bounding boxes for the object may be added to the current track for the object as the third chronological occurrence of the object. Method 400 then ends.

Figure 5:
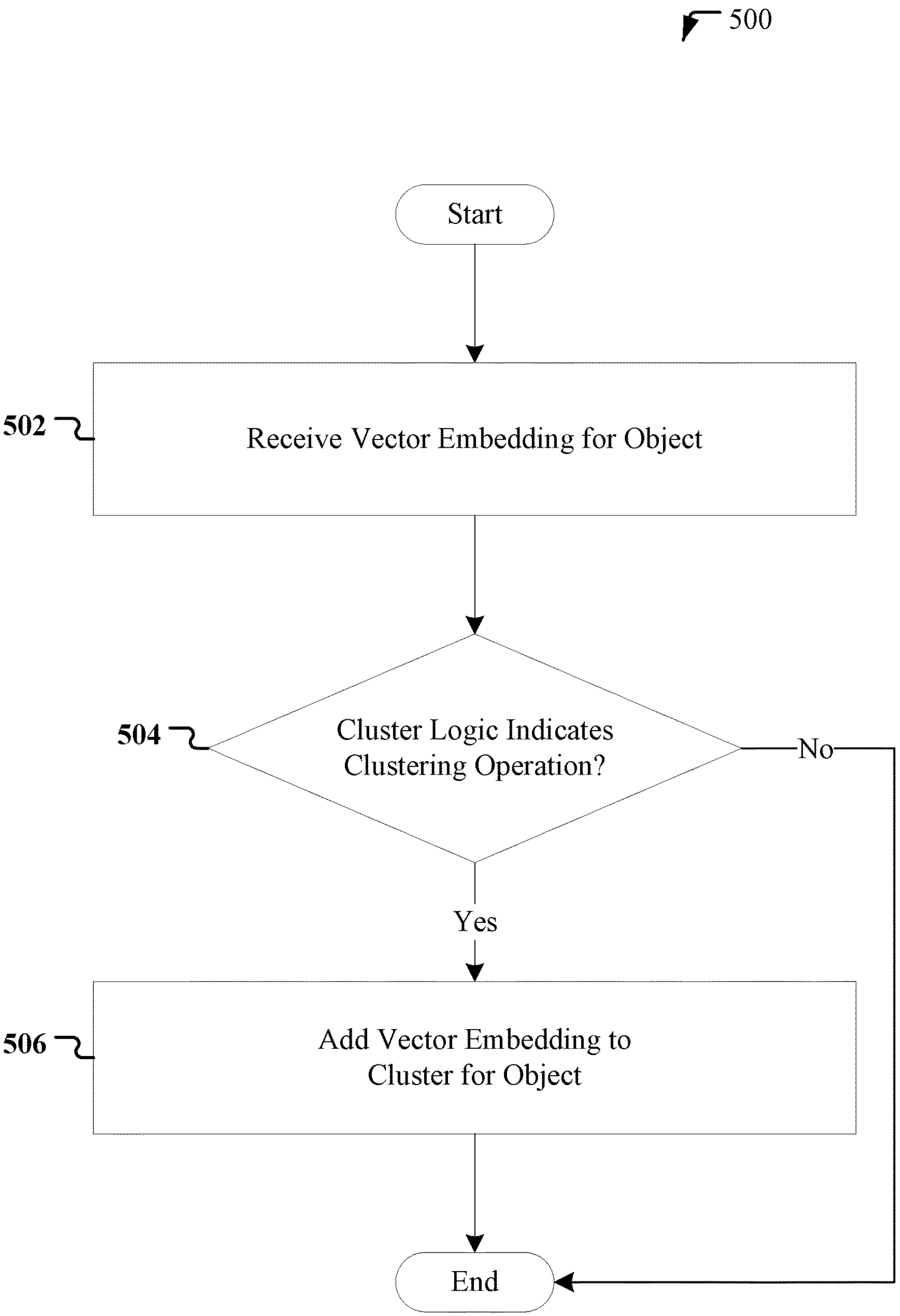
FIG. 5 illustrates an example method for a smart clustering technique for three dimensional (3D) objects.

FIG. 5 illustrates an example method 500 for a smart clustering technique for 3D objects. Method 500 begins at operation 502, where a vector embedding for an object is received by an image processing system, such as image processing system 104. The vector embedding comprises numeric representations of features of the object (e.g., color data, edges, pixel coordinates) in a representative bounding box. In examples, the vector embedding is created by universal embedding model 118.

At decision operation 504, clustering logic is applied to determine whether the vector embedding is to be added to a cluster of vector embeddings for the object. In examples, the clustering logic indicates that a clustering operation is to be performed after a specified interval of frames have been evaluated or after a specified number of representative bounding boxes have been created for an object. For instance, the clustering operation may be performed every fifth frame or after every third representative bounding box has been created. Alternatively or additionally, the clustering logic indicates that a clustering operation is to be performed based on the number of representative bounding boxes that have already been clustered for the object. For instance, the clustering operation may be performed after one representative bounding box has been created, then after four additional representative bounding boxes have been created, then after sixteen additional representative bounding boxes has been created, and so on.

If the clustering logic determines that the vector embedding is to be added to a cluster for the object, method 500 proceeds to operation 506. At operation 506, the vector embedding is compared to the average vector embedding for one or more clusters for the object. For instance, the vector embedding may be compared to a first average vector embedding for a first cluster of vector embeddings representing a first perspective of the object and to a second average vector embedding for a second cluster of vector embeddings representing a second perspective of the object. The vector embedding is then added to the cluster of the average vector embedding that is most similar to the vector embedding. Alternatively, the vector embedding may be added to a new cluster for the object. Method 500 then ends.

If the clustering logic determines that the vector embedding is not to be added to a cluster for the object, method 500 ends.

Figure 6:
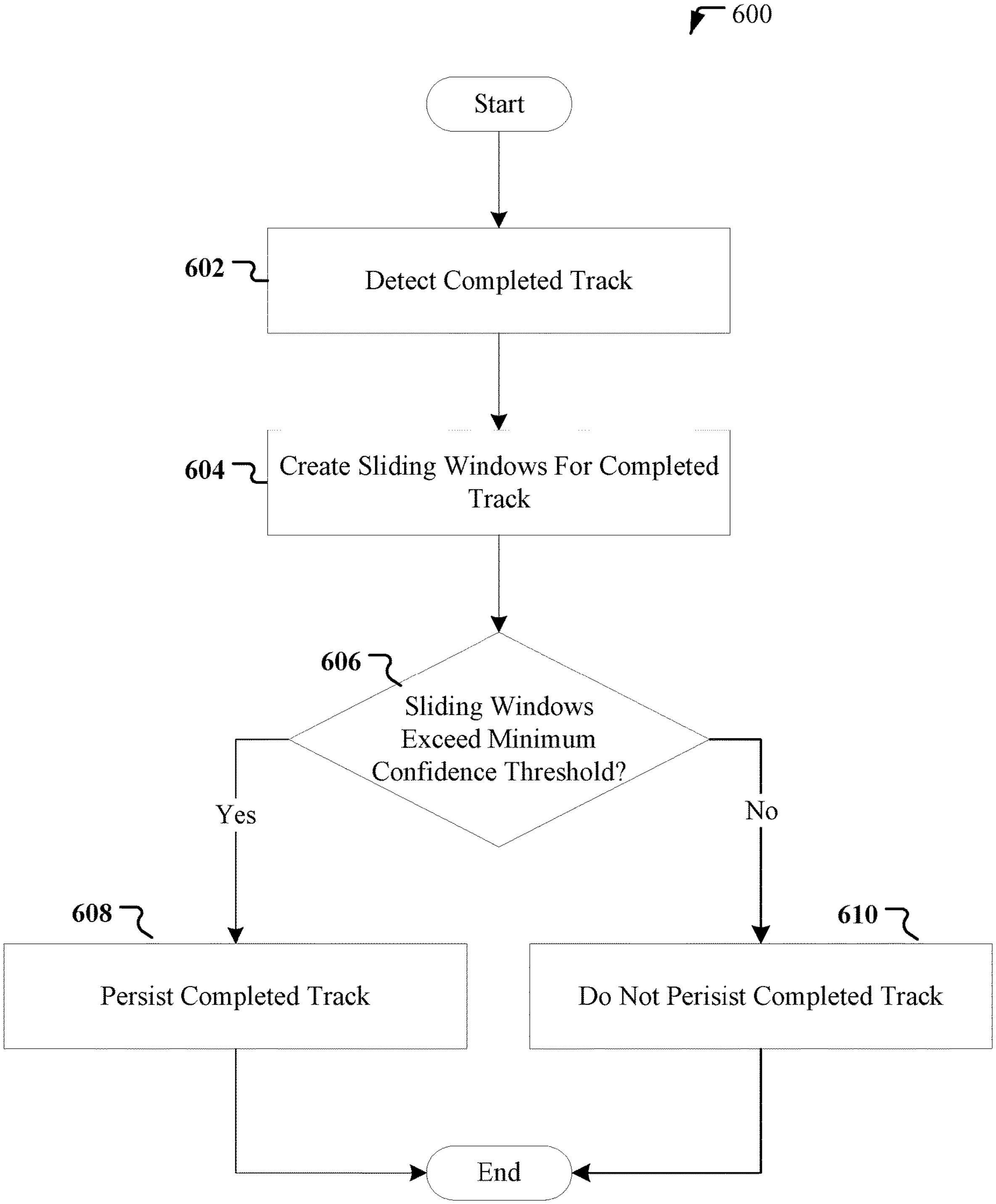
FIG. 6 illustrates an example method for determining whether to persist a completed track.

FIG. 6 illustrates an example method 600 for determining whether to persist a completed track. Method 600 begins at operation 602, where a completed track is detected by an image processing system, such as image processing system 104. In some examples, the completed track is detected upon completion of the track. For instance, after an object is no longer detected in image content for a specified time period (e.g., ten seconds) or a specified number of frames (e.g., 20 frames), an indication that the track is now completed may be provided to a track storage mechanism, such as object tracker 110. In other examples, an operation may be executed at a predefined time period (e.g., once a minute, once an hour, or once a day) to determine whether one or more tracks have been completed.

At operation 604, sliding windows are created for the completed track. In examples, the track persistence logic causes multiple sliding windows for a completed track (or a portion of the completed track) to be created. Each sliding window comprises at least a subset of the frames comprised in the completed track. For instance, for a completed track comprising 40 frames, two non-overlapping sliding windows are created, each sliding window comprising 20 frames. Alternatively, overlapping sliding windows may be created. For instance, for the same completed track comprising 40 frames, a first sliding window comprises frames 0-20, a second sliding window comprises frames 10-30, and a third sliding window comprises frames 20-40. A median confidence calculation is calculated for each sliding window based on the median confidence score for the representative bounding boxes in the frames of the sliding window.

At decision operation 606, track persistence logic is applied to determine whether the sliding windows exceed a minimum confidence threshold value. In examples, the track persistence logic determines whether the median confidence calculation for a predefined number or percentage of the sliding windows is above a minimum confidence threshold value. For instance, the track persistence logic may specify that 90% of the sliding windows in a completed track must have a median confidence calculation above the confidence threshold value. In another instance, the track persistence logic may specify that a certain number or percentage of contiguous sliding windows must have a median confidence calculation above the confidence threshold value.

If the track persistence logic determines that the median confidence calculation for the sliding windows is above the minimum confidence threshold value, method 600 proceeds to operation 608. At operation 608, the completed track is persisted. For example, the completed track may be assigned a time-to-live value and/or transmitted to a storage location for long-term storage. Method 600 then ends.

If the track persistence logic determines that the median confidence calculation for the sliding windows is not above the minimum confidence threshold value, method 600 proceeds to operation 610. At operation 610, the completed track is deleted or marked for deletion. Method 600 then ends.

Figure 7:
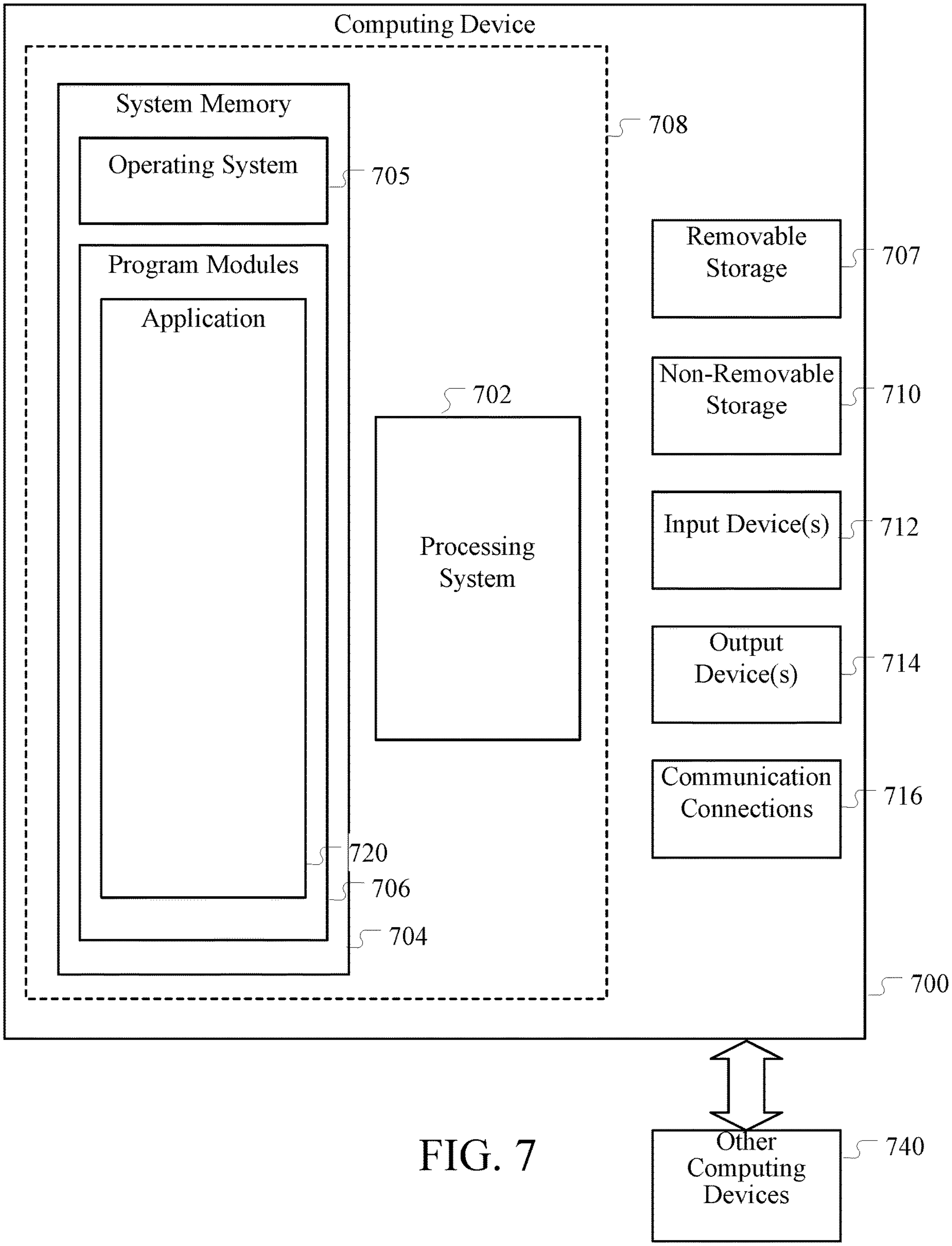
FIG. 7 is a block diagram illustrating example physical components of a computing device for practicing aspects of the disclosure.

FIG. 7 is a block diagram illustrating physical components (e.g., hardware) of a computing device 700 with which aspects of the disclosure may be practiced. The computing device components described below may be suitable for the computing devices and systems described above. In a basic configuration, the computing device 700 includes at least one processing system 702 and a system memory 704. Depending on the configuration and type of computing device, the system memory 704 comprises volatile storage (e.g., random access memory (RAM)), non-volatile storage (e.g., read-only memory (ROM)), flash memory, or any combination of such memories.

The system memory 704 includes an operating system 705 and one or more program modules 706 suitable for running software application 720, such as one or more components supported by the systems described herein. The operating system 705, for example, is suitable for controlling the operation of the computing device 700.

Furthermore, embodiments of the disclosure may be practiced in conjunction with a graphics library, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, or optical disks. Such additional storage is illustrated in FIG. 7 by a removable storage device 707 and a non-removable storage device 710.

As stated above, a number of program modules and data files may be stored in the system memory 704. While executing on the processing system(s) 702, the program modules 706 (e.g., application 720) may perform processes including the aspects described herein. Other program modules that may be used in accordance with aspects of the present disclosure include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 7 may be integrated onto a single integrated circuit. Such an SOC device may include one or more processing systems/units, graphics units, communications units, system virtualization units and various application functionality all of which are integrated (or "burned") onto the chip substrate as a single integrated circuit. When operating via an SOC, the functionality described herein with respect to the capability of a client to switch protocols, may be operated via application-specific logic integrated with other components of the computing device 700 on the single integrated circuit (chip). Embodiments of the disclosure may also be practiced using other technologies capable of performing logical operations such as, for example, AND, OR, and NOT, including mechanical, optical, fluidic, and quantum technologies. In addition, embodiments of the disclosure may be practiced within a general-purpose computer or in any other circuits or systems.

The computing device 700 also has one or more input device(s) 712 such as a keyboard, a mouse, a pen, a sound or voice input device, a touch or swipe input device, etc. The output device(s) 714 such as a display, speakers, a printer, etc. may also be included. The aforementioned devices are examples and others may be used. The computing device 700 may include one or more communication connections 716 allowing communications with other computing devices 750. Examples of suitable communication connections 716 include radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 704, the removable storage device 707, and the non-removable storage device 710 are all computer storage media examples (e.g., memory storage). Computer storage media includes RAM, ROM, electrically erasable ROM (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information, and which can be accessed by the computing device 700. Any such computer storage media may be part of the computing device 700. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, communication media may include wired media such as a wired network or direct-wired connection, and wireless media such as acoustic, RF, infrared, and other wireless media.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, it is envisioned that variations, modifications, and alternate aspects fall within the spirit of the broader aspects of the general inventive concept embodied in this application do not depart from the broader scope of the claimed disclosure.

What is claimed is:

1. A system comprising:

a processing system; and memory comprising computer executable instructions that, when executed, perform operations comprising:

detecting an object in a current frame of image content, wherein detecting the object comprises creating multiple candidate bounding boxes for the object, each candidate bounding box comprising at least a portion of the object;

comparing the multiple candidate bounding boxes to a predicted bounding box for the object, wherein the predicted bounding box is generated based on a current track for the object, the current track including a first previous frame comprising the object;

based on the comparing, filtering the multiple candidate bounding boxes, wherein the filtering identifies a representative bounding box from the multiple candidate bounding boxes, the representative bounding box being a closest match to the predicted bounding box; and adding the current frame comprising the representative bounding box to the current track.

2. The system of claim 1, the operations further comprising:

prior to detecting the object in the current frame, receiving the image content at an image tracking system trained to detecting objects of interest and tracking movement of the objects of interest over a time period, wherein the image tracking system is stored in the memory of the system.

3. The system of claim 2, wherein:

the objects of interest are predefined to include specified classes of objects; and an object detector of the image tracking system is trained to detect the specified classes of objects.

4. The system of claim 2, the operations further comprising:

in response to receiving the image content, using an image processor of the image tracking system to identify a plurality of frames in the image content, the plurality of frames including the current frame and the first previous frame; and preprocessing a frame in the plurality of frames, the preprocessing including at least one of:

modifying color formatting of the frame;

modifying an aspect ratio of the frame; or performing filtering or segmentation of the frame.

5. The system of claim 1, wherein detecting the object further comprises assigning a confidence score to each candidate bounding box of the multiple candidate bounding boxes.

6. The system of claim 5, wherein the confidence score represents a probability that the object belongs to a particular object class.

7. The system of claim 1, wherein generating the predicted bounding box comprises determining a predicted location of the object in the current frame based on a first location of the object in the first previous frame.

8. The system of claim 7, wherein:

the current track further includes a second previous frame comprising the object, the second previous frame being sequentially prior to the first previous frame; and determining the predicted location of the object in the current frame comprises determining a motion path of the object based on the first location of the object in the first previous frame and a second location of the object in the second previous frame.

9. The system of claim 1, wherein comparing the multiple candidate bounding boxes to the predicted bounding box comprises determining an Intersection over Union (IoU) score for each of the multiple candidate bounding boxes, the IoU score indicating an amount of similarity between the predicted bounding box and a respective candidate bounding box.

10. The system of claim 1, wherein filtering the multiple candidate bounding boxes using a filtering algorithm to remove bounding boxes from the multiple candidate bounding boxes until one bounding box for the object remains, the one bounding box being the representative bounding box.

11. The system of claim 10, wherein the filtering algorithm is a Non-Maximum Suppression (NMS) algorithm.

12. The system of claim 1, wherein the current track represents a motion or a position of the object through multiple frames of the image content.

13. The system of claim 1, wherein adding the current frame comprising the representative bounding box to the current track includes at least one of:

adding a confidence score for the representative bounding box to the current track; or adding metadata for the representative bounding box to the current track.

* * * * *